US 6,742,830 B2

(12) United States Patent
Zimmerman et al.

(10) Patent No.: US 6,742,830 B2
(45) Date of Patent: Jun. 1, 2004

(54) SHOCK-ABSORBENT LINING ELEMENT FOR THE INTERIOR OF A VEHICLE

(75) Inventors: Eric Zimmerman, Kassel (DE); Friedhelm Manzke, Kassel (DE); Thomas Pratsch, Altmannstein (DE)

(73) Assignee: Sai Automotive Sal GmbH, Wörth (DE)

( * ) Notice: Subject to any disclaimer, the term of this patent is extended or adjusted under 35 U.S.C. 154(b) by 0 days.

(21) Appl. No.: 10/356,680

(22) Filed: Jan. 31, 2003

(65) Prior Publication Data

US 2003/0214152 A1 Nov. 20, 2003

Related U.S. Application Data

(63) Continuation of application No. PCT/DE02/01765, filed on May 16, 2002.

(51) Int. Cl.⁷ .............................................. B60R 13/02
(52) U.S. Cl. ................... 296/146.7; 296/153; 280/751
(58) Field of Search .......................... 296/39.1, 146.7, 296/153, 189, 187.05, 1.09; 280/751; 297/411.21, 411.22

(56) References Cited

U.S. PATENT DOCUMENTS

| | | | | | |
|---|---|---|---|---|---|
| 3,387,881 | A | * | 6/1968 | Stepanek et al. | 296/153 |
| 5,290,087 | A | * | 3/1994 | Spykerman | 296/153 |
| 5,445,430 | A | * | 8/1995 | Nichols | 296/153 |
| 5,527,084 | A | * | 6/1996 | Scherf | 296/153 |
| 5,531,499 | A | * | 7/1996 | Vecchio et al. | 296/146.7 |
| 5,549,327 | A | * | 8/1996 | Rusche et al. | 280/751 |

FOREIGN PATENT DOCUMENTS

FR 1580451 * 9/1969 .................. 296/153

* cited by examiner

Primary Examiner—Dennis H. Pedder
(74) Attorney, Agent, or Firm—Martin Fleit; Paul D. Bianco; Fleit Kain Gibbons Gutman Bongini & Bianco, P.L.

(57) ABSTRACT

A lining element arranged on the side of a vehicle chassis part facing the interior with at least one section, which can be deformed due to the effect of an external force, and which will absorb impact energy by transforming into a deformed state. A support layer is formed in the region of the deformable section from, viewed from the interior, an outer deformation part, an inner deformation part, and a step edge set between these parts. The outer deformation part, the inner deformation part, and the step edge change their slope under the effect of the external force for energy absorption.

10 Claims, 2 Drawing Sheets

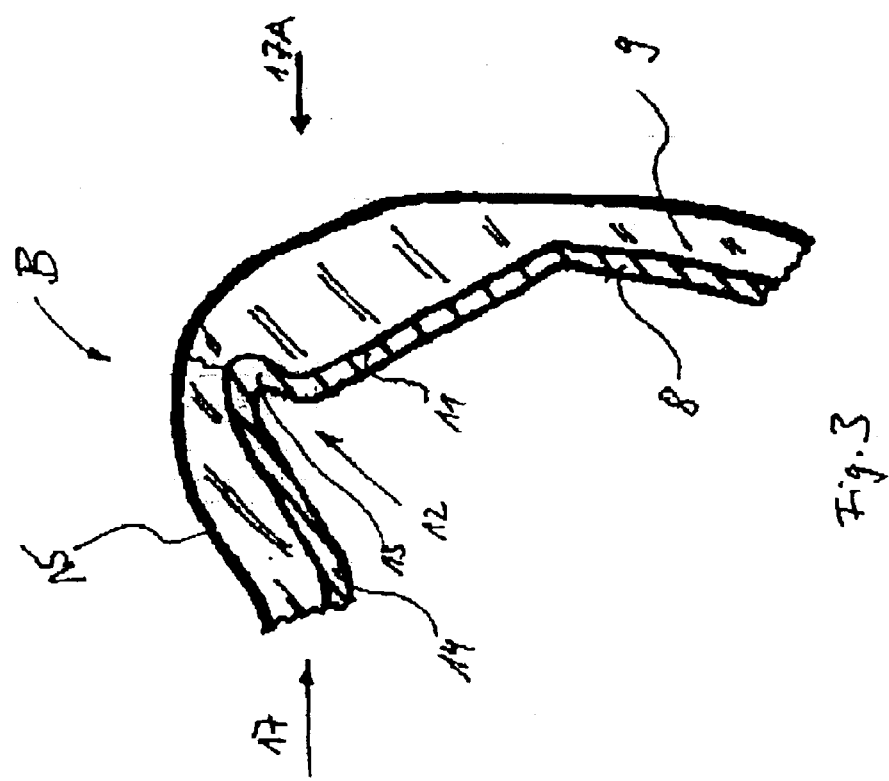

SHOCK-ABSORBENT LINING ELEMENT FOR THE INTERIOR OF A VEHICLE

RELATED APPLICATION

This application is a continuation of earlier filed International Application PCT/DE02/01765 filed May 16, 2002 designating the United States of America, the entire content of which is expressly incorporated herein by reference thereto.

BACKGROUND OF THE INVENTION

1. Field of Invention

The invention concerns a shock-absorbent lining element for the interior of a vehicle. More specifically, the invention concerns an armrest for vehicles, which can be used, e.g., in the inner linings of doors or fixed side elements.

2. Prior Art

Vehicle doors typically consist of an outer metal panel and an inner metal panel, which are connected to each other, and the outer sides of the component also form a decorative inner lining as a border to the passenger compartment. For reinforcing the doors with reference to improving side-impact behavior, a reinforcing profiled section is often arranged on the inner side of the outer metal panel at a height approximately in the middle. Between the outer and inner sides there are functional elements, such as, e.g., window-raising systems, loudspeakers, locks, and if necessary, other elements, which are frequently mounted on their own module supports. These functional elements are mentioned for completeness, but they play no role with reference to the invention.

The inner lining typically carries an arm support, which consists of a rigid support, a relatively hard foam layer, which lies on top of the support and which provides a pleasant feel, and a sealing decorative layer, which faces the passenger compartment and which is made of leather, synthetic leather, textile, or plastic film. The armrest often projects past the surface of the inner lining into the passenger compartment, in height somewhere between the edge of the hips and the lower ribs of the vehicle occupant. If there is a side impact, the entire vehicle door is pressed inwards in the direction of the vehicle occupant. The reinforcing profiled section cannot completely prevent this inward pressing force. Thus, there is a large danger that the armrest extending past the surface of the side lining could be pressed into the mentioned region of the upper body of the vehicle occupant and cause considerable injury, even with the presence of so-called side airbags, which can be deployed outwards from the inner lining or from the seat. This risk of injury is considerably reduced if the force, with which the armrest is pressed against the body during deformation, does not exceed 1000 N. This also corresponds to the new requirements for automotive manufacturers.

Constructions for deformable arm supports, which, e.g., consist of plastic support material and which include intended rupture points in the support material, are known. A disadvantage here is that a rupture of the support material, particularly if it is brittle, can produce sharp edges and splinters, which can penetrate through the decorative material and can thus cause additional risk of injury. It has been shown that the breaking behavior of these intended rupture points is strongly dependent on temperature in an undesired way.

Constructions with laminar support parts, which can move relative to each other, have also proven to be unsuitable. If the support is composed of individual layers that loosely grip one another, then it does not provide the necessary stability required by a support layer for arm supports. The connection of the support layer to the decorative layer by means of a known foam lamination method with, e.g., polyurethane, which represents an economical method often used for this purpose, has not shown the desired successful results. The foam does indeed stabilize the layers and it also absorbs energy in the case of deformation, but it also springs back due to its elasticity. A reduction of force to the vehicle occupant is thus not achieved.

By connecting the layers to cross-pieces formed as intended rupture points, the stability of the support is increased, but this also produces the disadvantages mentioned above with reference to intended rupture points.

Constructions with open honeycomb structures set perpendicular to the direction of deformation would allow very good energy absorption. However, they are unsuitable because they lose their good deformation properties in the foam lamination process either due to elastic foam penetrating into the honeycomb structures or due to cover layers preventing foam penetration. With reference to the elastic foam in the case of penetration into the honeycomb structures, there results the same state as for foam-covered layers.

From U.S. Pat. No. 5,181,759A, DE-AS 1 267 116, and DE 41 40 706 A1, armrests are known which, however, do not sufficiently absorb energy transmitted due to an external force.

According to DE 30 26 736 A1, deformation of an armrest is achieved in that the walls of a projecting region have zones of reduced wall thickness for the purpose of forming intended rupture points or intended bending points. Therefore, intended rupture points are formed so that for an impact on a projecting region, these points break, so that the jacket elements become nested between the notches.

SUMMARY OF THE INVENTION

The main object of the invention is to provide an arm support, which deforms on impact with the body of the vehicle occupant such that the force exerted by the arm support on the body of the vehicle occupant in the region approximately between the edge of the hips and the lower ribs remains below the critical value of 1000 N, but which can also provide the required strength for support on the top side of the arm support.

The main object of the invention is accomplished, according to the invention, by using a lining element arranged on the side of a vehicle chassis part facing the interior with at least one section, which can be deformed due to the effect of an external force, and which is provided to absorb impact energy by transforming into a deformed state. The inventive improvement comprises a support layer being formed in the region of the deformable section from, viewed from the interior, an outer deformation part, an inner deformation part, and a step edge set between these parts, and the outer deformation part, the inner deformation part, and the step edge change their slope under the effect of the external force for energy absorption.

According to the invention, a lining element arranged on the side of a vehicle chassis part facing the interior with at least one deformation section, which is provided to absorb impact energy for the effect of an external force by transforming into a deformed state, that has been improved by having at least the deformation section formed from multiple layers from a support layer from tough material,
a top layer facing the vehicle interior, and
a layer set between these layers, which is formed from elastic foam.

The support layer has a shock-absorbing region, which is set in the region of the deformation section and which is formed from, viewed from the interior, an outer deformation part, an inner deformation part, and a step edge, which is set between these parts and which runs at an angle range between 70–85 degrees relative to the inner deformation part, so that for an effect of the external force the angle between the outer deformation part and the inner deformation part is decreased for energy absorption.

The lining element is arranged on the side of a vehicle chassis part facing the interior as described above with the step depth given between the outer deformation part and the inner deformation part equal to 8.4 mm. In the preferred embodiment, the support layer is formed from wood fibers.

The invention includes the further improvement of (a) the outer deformation part and the inner deformation part being spaced a distance of from 7 to 9 mm perpendicular to the received force direction, (b) the material of the support layer having a density in the range of 0.5–0.7 g/cm$^3$ and the support layer having a thickness in the range between 1.8–2.0 mm, (c) the support layer being formed from polyester fibers and from glued wood fibers, and wherein the polyester fibers constituting 20–25 wt % and the wood fibers constituting 80–75 wt %, and spruce, fir, or pine wood being used for the wood fibers, and also that the wood fibers having a fiber length of 0.1–2 cm. The fibers are glued with a binding agent comprised of a thermally cross-linkable acrylate resin, and the thermally cross-linkable acrylate resin is present from 10–15 wt % relative to the amount of wood fibers present.

One advantage of the invention is the simple manufacturing process of the arm support according to the invention. In comparison with the molds required today for production, the contours must be modified, which is possible without problems; however, usually no additional complicated moving parts are necessary in the mold, particularly in the press mold for the support. In comparison with conventional constructions, additional components in or on the armrest are not needed.

It is further advantageous that intended rupture points in the support material are not needed; these rupture points do not contribute significantly to energy absorption and also increase the risk of sharp end pieces or splintered parts severing the foam and decorative layer, and thus, increasing the risk of injury for the vehicle occupants.

Absorption of impact energy is achieved by the armrest according to the invention through deformation of the support. This gives the especially advantageous result that for deformation of the arm support, no elastic foam parts are pinched by the support and/or decorative material.

Corresponding to the requirements in each individual case, the arm support according to the invention can be manufactured either as a separate part, which is then connected to the lining during the assembly of the lining element, or else, in the case of an arm support integrated in the lining, the arm support is processed directly during the production of the support element.

BRIEF DESCRIPTION OF THE DRAWINGS

The invention is described in more detail in the following with reference to the drawing. Shown are.

DETAILED DESCRIPTION OF PREFERRED EMBODIMENTS

Figure 1:
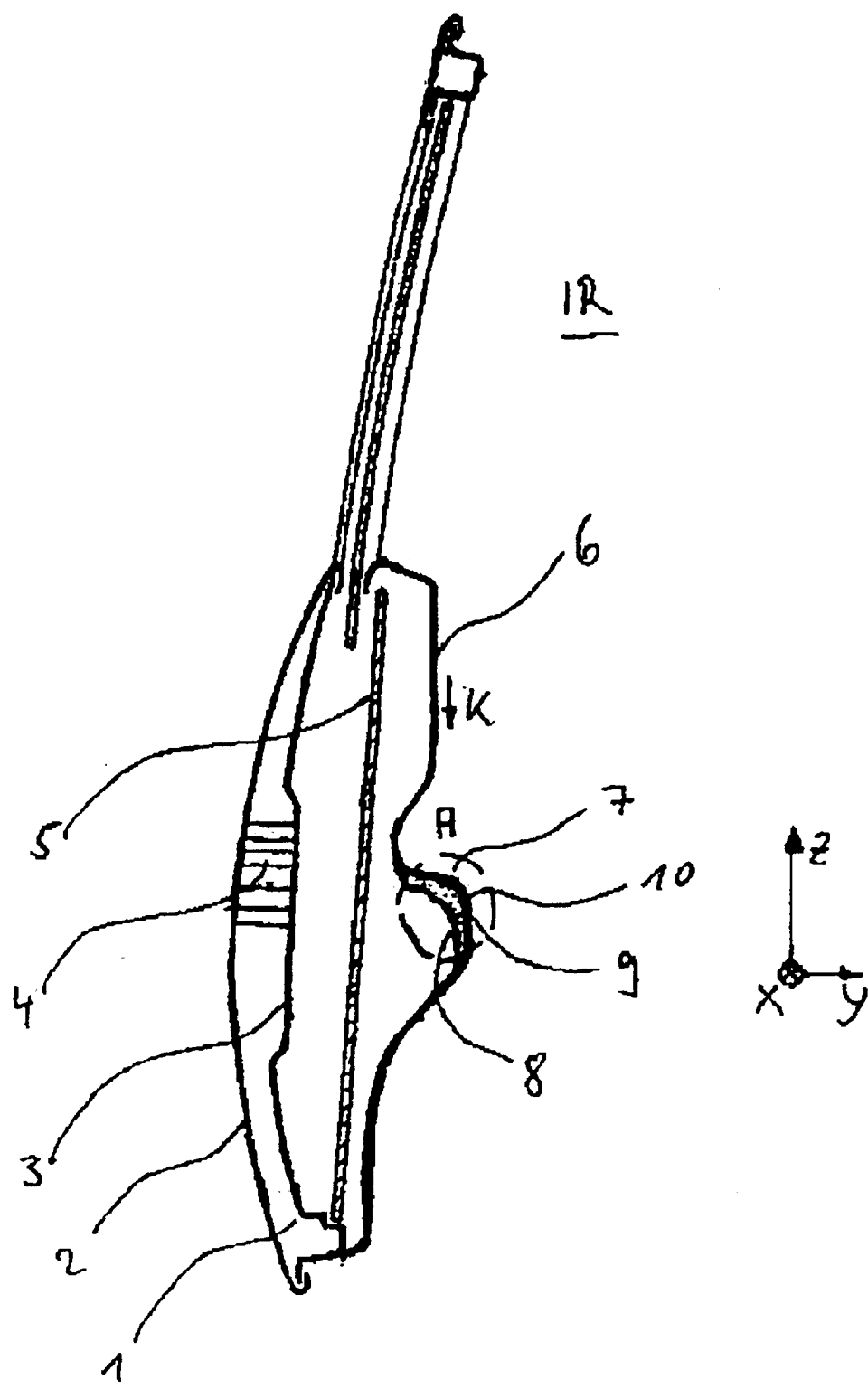
FIG. 1, a schematic view through a vehicle door with an armrest or arm support as an example embodiment of the invention, FIG. 2, an enlarged region A of FIG. 1 with a detail from the arm support with the step in the support, FIG. 3, the region shown in FIG. 2, but in a deformed state after impact on the vehicle door from outside.

The invention is described with the example of its use on a vehicle door of a motor vehicle. In general, the invention is provided for shock-absorbing lining elements for the interior of vehicles in order to absorb impact energy. The invention can be applied, e.g., to corresponding fixed side parts or other inner equipment or other chassis parts, which should implement the function according to the invention.

FIG. 1 shows a schematic section through a vehicle door as an application of the invention with an outer side 1 which faces the surroundings of the vehicle and which is formed, e.g., from an outer metal panel 2 and an inner metal panel 3. In the outer side 1, a side-impact reinforcement element 4, which is typically arranged between the two metal panels, is shown. On the vehicle side, which is set opposite the outer side 1, there is an inner lining 6, whose surface faces the interior of the vehicle. Between the inner lining 6 and the outer side 1, there is a module support as a support plate for functional parts not shown in this illustration, such as window lifters, locks, loudspeakers, etc.

For orientation, a vehicle-specific coordinate system is drawn in FIGS. 1 and 2 with a vehicle longitudinal direction X running in the direction of travel, a cross-wise or width direction Y, and a vertical or height direction or vehicle height axis Z running upwards. With reference to the inner lining, a direction R is indicated, which runs essentially opposite the height direction Z and follows the contour of the inner lining or a layer of this lining. Consequently, the location-dependent direction R is designated as the contour direction K of the inner lining with reference to the contour profile directed opposite the vehicle height axis Z. The direction Y approximates the direction in which an applied impact force can be received according to the invention. The applied impact force acts in a certain angle range, which extends in both vertical directions starting from the horizontal direction Y.

The inner lining 6 includes a region B extending at least over a part of its contour direction R, which experiences a predetermined deformation under a predetermined external effect, and which is composed of a support layer 8, a foam layer 9, a top layer or arm support layer or arm support 7, and corresponding to the particular application, if necessary, also a decorative layer 10 facing the interior of the vehicle or the passenger, wherein the top layer can also be the decorative layer. The sequence of indicated layers is given for a view of the construction in the direction from the interior of the chassis part or the vehicle door to the interior IR of the vehicle. Other layers, such as, e.g., adhesive layers, can also be arranged between these layers. Analogous to the contour direction K, a likewise location-dependent support layer direction T is drawn in FIG. 2 essentially opposite the height axis Z.

A detail A of the arm support shown in FIG. 1 as an example of the inner lining according to the invention is illustrated at an enlarged scale in FIGS. 2 and 3. The location-dependent contour directions K and the support layer directions T of the region B, relative to the impact direction 17, are formed such that for the received outer force 17, a bending motion or change in angle of the corresponding sections of the support layer 8 is produced according to the invention. The contour directions K and the support layer directions T of the region B of the inner lining 6 consequently remain in a predetermined range of angles relative to a direction 17 of a received force due to an impact from outside.

In the following, the section of the top layer 7 is designated as the top deformation section or first section 15, which can interact, in particular, with a support or second section 16 extending in the contour direction K. Thus, the contour directions K and support layer directions T of such a support section 16 preferably form an angle difference with the directions K or T of the deformation section 15. In the illustration of FIGS. 2 and 3, the contour directions K and support-layer directions T of the deformation section or first section 15 follow along the vehicle interior IR so that the deformation section 15 for the embodiment of an armrest can be viewed from above by the driver. The second section 16 starts at the first top section as seen in the direction of the view of the driver. Therefore, in the illustrated embodiment, the deformation section 15 can also be considered as the top side and the second section 16 as the bottom side.

Viewed from the vehicle interior IR, the support layer 8 is laid on the outer side of the foam layer 9. The support layer 8 has, in its undeformed state, an S-shaped or curvilinear or step-shaped or indented-shaped profile, as viewed in the support-layer direction T. This support section, which is called deformation section in the following, is designated in FIG. 2 with reference symbol S. For a curvilinear profile of support layer 8 in the deformation section S, the support layer 8 includes two bends oriented opposite each other, where the profile of the support layer 8 has at least one trigger point in the shape of an inflection point in the section S. The deformation section S has at least one trigger point or one inflection point 12 for the curves in the deformation section in support layer 8.

Preferably, the deformation section S includes a step edge 13, which, for a step-shaped formation of the deformation section S in its undeformed state, is preferably shaped essentially straight or flat, and for a curvilinear profile of the deformation section S, can be formed straight or likewise curvilinear. Due to the function according to the invention, the trigger point according to the invention forms a region of the step edge 13, in which the folding or bending motion of the support layer occurs due to the applied force 17. Thus, in the region of the trigger point 12, a folding or bending line is formed due to deformation according to the folding or bending motion. From the view from the interior IR, the trigger point 12 is located between an outer deformation part 14 and an inner deformation part 11. In the case of the armrest illustrated in FIGS. 1–3, the outer deformation part 14 can also be viewed as a step top part and the inner step part 11 can be viewed as a step bottom part. Along the outer deformation part 14, as illustrated in FIG. 2, the support layer 8 in the support layer direction T can form a right-turning curve and after the trigger point 12 a left-turning curve. However, the reverse can also be true, first there can be a left-turning curve and then a left-turning [sic; right-turning] curve after the trigger point 12.

Several deformation sections S can also be arranged in the region of the top deformation section 15. At least one additional deformation section S can also be arranged on an adjacent second top section 16.

The step edge can curve along the support layer direction T (cf. FIG. 2), run straight, or be eliminated completely. At least in the last case, an inflection point occurs in the region or in the vicinity of the trigger point 12. In the region of the trigger point 12, an indentation or groove (not shown) or several indentations or grooves can be formed in the support layer 8. This can improve the effect provided by the invention, however, this is not required for the deformation according to the invention. If grooves are formed in the support, they are formed such that the support is not ripped apart during deformation.

On the side facing the vehicle interior IR, the inner lining 6 can have on its top side the top layer 7 or the decorative layer 10. The decorative layer can be formed from leather, synthetic leather, plastic film, or a textile cover.

Preferably, the foam layer 9 fills the region between the deformation section 15 of the top layer 7 or the decorative layer 10 and the support layer 8. The foam layer 9 is preferably formed from a plastic foam, such as, e.g., polyurethane, polypropylene, or polystyrene, or combinations of these materials, wherein a suitable elasticity for realizing a required feel is provided.

FIG. 3 shows an arm support detail from FIG. 2 after application of force in the direction of arrow 17. The coupled force or the counter force originating from the occupant body or transport goods, which force, with contact with the inner lining, acts on the lining, is distributed in the region of the trigger point 12 into components, which act upwards, in the direction of the first section 15 of the arm support, and into components, which act in approximately the original direction of the arrow 17. This distribution of forces causes the deformation of the support layer 8. The rear deformation part 11 travels under the front deformation part 14, wherein the step edge 13 changes its slope. The force components act upwards in the direction of the first section 15, because the front deformation part 14 and the originally approaching, but not parallel maneuverable rear step part 11 are bent over the trigger point 12 or the step edge 13 in the vertical direction Z. In this way, the angle between the front 14 and the back 11 deformation part decreases. In this way, the deformation of the support layer 8, and thus the entire armrest, absorbs impact energy. The force 17 applied from the outside and the resulting deformation of the inner lining when this lining impacts the upper body of the vehicle occupant or transport goods or another component in the vehicle interior IR results in a maximum force in a predetermined deformation region of the inner lining in section S due to the deformation according to the invention.

For example, for the inner lining 6 according to the invention, due to the impact of an arm support projecting out of the inner lining due to a force set in the Euro-NCAP standard, the force acting between an occupant in the interior IR and the inner lining is under the set limit of 1000 N for a deformation or shortening of the armrest in the contour direction K of an amount of 20–30 mm.

Therefore, with the effect according to the invention, the angle between the front 14 and the back 11 deformation part decreases. In this way, the inner step part travels relative to the vertical direction Z upwards or downwards, according to how the deformation section S of the support layer 8 is formed. This deformation can also be viewed as a folding or bending motion through the inner 11 and outer 14 deformation part.

The support layer 8 is formed from a material, which exhibits both the required stability and also the strength necessary for the deformation, and which, in a known way, is pressed into the desired contour. The strength of the support layer 8 is provided such that in case of an impact, no large deformation work is necessary to achieve the effect according to the invention relative to the inner and outer deformation part. However, on the other hand, a minimum deformation work must also be required to generate this effect according to the invention. In order to meet these requirements, the material of the support layer 8 has a density, preferably in the range of 0.5–0.7 g/cm³, and a thickness of the support layer 8 between 1.8 mm and 2.0 mm. Between the outer deformation part 14 and the inner deformation part 11 is a distance running perpendicular to the received force direction 17 between 7 and 9 mm and preferably at 8 mm. In a preferred embodiment, this distance is equal to between 8 and 8.5 mm. For a curved profile of the outer deformation part 14 and the inner deformation part 11, geometric center lines or center-of-gravity lines of the corresponding deformation parts 11, 14 can be used as reference lines for this dimension.

For the case where there is a curved or flat step edge 12 between the front step part 14 and the back step part 11, this edge runs preferably between 70° and 85° relative to the back step part 11 and in particular at approximately 75°. For a curved step edge 13, the profile or the aforementioned angle is defined from the tangents to the point of the inflection point.

For the support layer 8, a material is suitable, which exhibits both the required stability and also the strength needed for the deformation for achieving the effect according to the invention. In this way, a material is provided, which is formed from polyester fibers and/or glued wood fibers. Preferably, the material for the support layer 8 has a percentage for polyester fibers of 20–25 wt % and for wood fibers a percentage of 80–75 wt %. In particular, fibers from spruce, fir, or pine wood can be used for the wood fibers, wherein, in a special embodiment, a fiber length of 0.1–0.2 cm is selected. Advantageously, the fibers are treated or injected with binding agents or at least partially coated for this treatment. As the binding agent, preferably a thermally cross-linkable acrylate resin is used. Here, in particular an amount of this acrylate resin can be used, which corresponds to 10–15 wt % relative to the amount of wood fibers. This material possesses the required shape retention for the arm support and also the corresponding strength for the deformation work in the required temperature ranges between −40° C. and +90° C. without becoming brittle and splintering or softening too much at high temperatures.

For production of the support layer 8, the previously described material can be processed into a semi-finished product in the form of mats, which are then pressed into the support-layer shape. For this pressing process, one or more trigger points 12 are molded with the step edge 13 between the step parts 11 and 14.

In the case of door deformation due to a side impact, if the arm support contacts the body, then a force transfer begins in the armrest through the decorative layer and foam into the support. In the region of the trigger point, the force profile is distributed in the support into force components, which act further in the original direction, and force components, which act upwards. The support part deforms such that the step bottom part travels under the step top part. Due to the force components acting upwards in the region of the trigger point, the top side of the arm support is folded upwards in that region. The arm support bends in the direction of the soft lamination, wherein there is not significant pressure on the foam layer. The part of the arm support projecting from the door inner side is shortened by 20–30 mm. Due to the permanent deformation of the arm support, energy is absorbed. The force on the upper body of the vehicle occupant remains below the limit of 1000 N.

From FIGS. 1–3, and in particular from FIG. 1, it can be seen that the shock-absorbing lining element according to the invention does not have to be provided on a vehicle door, but instead it can be arranged on the inner side of an arbitrary chassis part, in order to absorb or dissipate possible impact energy. The shock-absorbing lining element can also be used for protecting transport goods.

List of reference symbols

| | |
|---|---|
| 1 | Outer side |
| 2 | Outer metal panel |
| 3 | Inner metal panel |
| 4 | Reinforcing profiled element |
| 5 | Module support |
| 6 | Inner side |
| 7 | Arm support |
| 8 | Support |
| 9 | Foam |
| 10 | Decorative layer |
| 11 | Inner deformation part or step bottom part |
| 12 | Trigger point |
| 13 | Step edge |
| 14 | Outer deformation part or step top part |
| 15 | First section of region B or top part of arm support |
| 16 | Second section of region B or edge of arm support |
| 17 | Direction of a received external force |
| 17A | Direction of a counter force caused by the received external force 17 |
| K | Profile of the contour line of the inner lining 6 |
| T | Profile of the support layer 8 |
| X | Vehicle longitudinal direction |
| Y | Horizontal direction of the vehicle |
| Z | Vertical direction or height axis |

What is claimed is:

1. A lining for a motor vehicle having a door comprising an inner contoured one piece molded lining generally in the form of a panel extending vertically and horizontally over a door and whose exposed surface faces the vehicle interior, said lining projecting into the vehicle interior to function as an armrest and that can experience shock absorbency deformation and including a laminated armrest region extending over part of its contour, said laminated armrest region including (a) a top section that extends horizontally away from said door into the vehicle interior (b) a support section that extends vertically down from the top section to the bottom of the laminated region, said laminated armrest region being comprised of (i) a top layer exposed to the vehicle interior, (ii) a support layer composed of deformable material spaced below, and (iii) an intermediate layer of elastic foam between said top layer and support layer, said support layer in said top section extending substantially horizontally end having a bending region in which a first bend extends downwardly, and another bend extends substantially horizontally and is spaced vertically downwardly of the first bend, said bending region constituting a trigger point such that a vehicle side impact directed substantially horizontally against said laminated armrest region results in counter forces imposed on the top layer being distributed at the trigger point into components that act vertically upwardly to cause upward deformation of the support layer, a foreshortening of the top portion and absorption of impact energy.

2. A lining according to claim 1 wherein said support layer in said top section extends from said first bend to said another bend at en angle to the horizontal in the range of from about 70 degrees to about 85 degrees.

3. A lining according to claim 1 wherein said first bend and said another bend of said support layer in said top section are vertically displaced from about 7 mm to about 9 mm.

4. A lining according to claim 3 wherein said first bend and said another bend of said support layer in said top section are vertically displaced about 8.4 mm.

5. A lining according to claim 1 wherein said support layer is formed from wood fibers having a density in the range of from about 0.5 to about 0.7 g/cm$^3$ and the support layer having a thickness in the range of from about 1.8 to about 2.0 mm.

6. A lining according to claim 1 wherein said support layer is formed from a composition composed of from about 20 to about 25 wt % polyester fibers and from about 80 to about 75 wt % glued wood fibers.

7. A lining according to claim 6 wherein said wood fibers are glued with a binding agent comprised of a thermally cross-linkable acrylate resin.

8. A lining according to claim 7 wherein said thermally cross-linkable acrylate resin is present from about 10 to about 15 wt % based on the amount of wood fibers present.

9. A lining according to claim 6 wherein said glued wood fibers have a fiber length of from about 0.1 to about 2 cm.

10. A lining according to claim 6 wherein said glued wood fibers are selected from spruce, fir, pine wood fibers, and mixtures thereof.

* * * * *